United States Patent
Haider

(10) Patent No.: US 6,282,963 B1
(45) Date of Patent: Sep. 4, 2001

(54) NUMERICAL OPTIMIZATION OF ULTRASOUND BEAM PATH

(75) Inventor: Bruno Hans Haider, Ballston Lake, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/415,078

(22) Filed: Oct. 12, 1999

(51) Int. Cl.[7] .............................. G01N 29/06; A61B 8/00
(52) U.S. Cl. ............................... 73/602; 73/625; 73/626; 600/447
(58) Field of Search ............................ 73/602, 625, 626; 600/437, 440, 441, 443, 447, 454, 455, 456, 458

(56) References Cited

U.S. PATENT DOCUMENTS

| 4,644,795 | 2/1987 | Augustine | 73/625 |
| 5,623,928 | 4/1997 | Wright et al. | 128/661.01 |
| 5,976,089 | * 11/1999 | Clark | 600/447 |
| 6,056,693 | * 5/2000 | Haider | 600/443 |
| 6,066,099 | * 5/2000 | Thomenius et al. | 600/447 |
| 6,159,153 | * 12/2000 | Dubberstein et al. | 600/443 |

FOREIGN PATENT DOCUMENTS 0 335 578-A2 * 10/1989 (EP) ...................................... 600/447

* cited by examiner

Primary Examiner—Hezron Williams
Assistant Examiner—Rose M. Miller
(74) Attorney, Agent, or Firm—Jill M. Breedlove; Douglas E. Stoner

(57) ABSTRACT

In dual line ultrasound beamforming, an ideal transmit beam should have two peak locations, each following one of the receive beams. Dual beam steering by apodization creates such transmit beam; however, the resulting beam is optimized for only a single depth and significant line warping can occur away from that depth. The transmit beam shape in ultrasound multiline acquisition however, is improved by numerically optimizing the transmit beam, i.e., the aperture function, such that no line warping occurs over the entire depth of field. The aperture function is numerically optimized by numerically optimizing a Cost function which is dependent on the aperture function. The numerically optimized aperture function is then used in a multiline acquisition mode of an ultrasound imaging system.

20 Claims, 6 Drawing Sheets

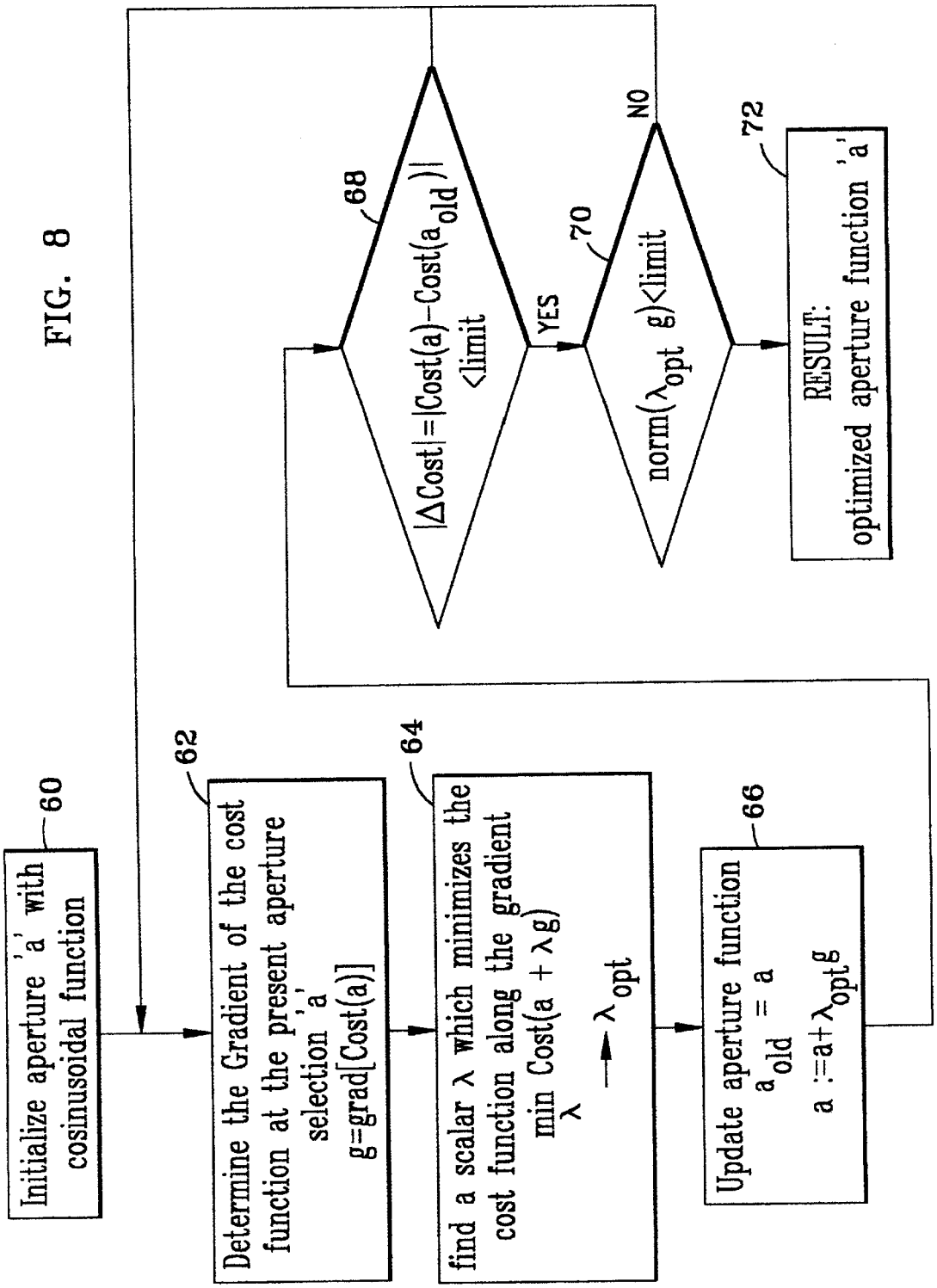

NUMERICAL OPTIMIZATION OF ULTRASOUND BEAM PATH

FIELD OF THE INVENTION

This invention generally relates to ultrasound imaging systems and, more particularly, to methods and apparatus for increasing the acoustic frame rate of ultrasound images.

BACKGROUND OF THE INVENTION

An ideal ultrasound imaging system will maintain its imaging resolution at an optimum value throughout the area of interest. One method for accomplishing this is often referred to as beamformation with the complete data set or $N^2$ reconstruction. With this method, the data acquisition sequence proceeds as follows: transmit with transducer element 1, receive with transducer elements 1 through N; transmit with transducer element 2, receive with transducer elements 1 through N; and so forth.

Since this approach requires $N^2$ transmit/receive operations, it is clearly not feasible for clinical imaging due to the data acquisition time requirements. However, it does permit a beamformation process in which each individual pixel of the image has its own specific set of beamformation parameters. By this method, one can achieve dynamic focusing on transmit beamformation as well as on receive, so that $N^2$ reconstruction is often considered the target or point of comparison by which clinically feasible approaches are measured. Thus, a data acquisition method that approaches the $N^2$ method while minimizing frame rate impact would be desirable.

A conventional ultrasound image is composed of multiple image scan lines. A single scan line (or small localized group of scan lines) is acquired by transmitting focused ultrasound energy at a point in the region of interest, and then receiving the reflected energy over time. The focused transmit energy is referred to as a transmit beam. During the time after transmit, one or more receive beamformers coherently sum the energy received by each channel, with dynamically changing phase rotation or delays, to produce peak sensitivity along the desired scan lines at ranges proportional to the elapsed time. The resulting focused sensitivity pattern is referred to as a receive beam. Scan line resolution is a result of the directivity of the associated transmit and receive beam pair.

Output signals of the beamformer channels are coherently summed to form a respective pixel intensity value for each sample volume in the object region or volume of interest. These pixel intensity values are log-compressed, scan-converted and then displayed as an image of the anatomy being scanned.

The frame rate of a medical ultrasound imaging system is determined by the number of transmit events necessary per frame. In conventional ultrasound imaging systems a transmit event is a focused beam transmitted in a particular direction or at a particular focal position. Frame rate in medical ultrasound imaging is a valuable resource. With increased frame rate, larger regions (as in color flow or three-dimensional imaging) or faster objects (e.g., the heart) can be imaged. In addition, image enhancement methods such as video integration (noise reduction) or compounding (speckle reduction) can also use up frame rate.

In conventional medical ultrasound imaging, a single pulse is transmitted in a particular direction and the reflected echoes are coherently summed to form a single line in the image frame. The amount of time necessary to form that scan line is determined largely by the round-trip transit time of the ultrasonic pulse. Furthermore, many scan lines are present in an image frame to densely sample the anatomical region of interest. Thus, the frame rate in conventional medical ultrasound imaging is determined by the sound propagation speed and the size of the region of interest.

High-frame-rate systems are desirable for present 2D (two-dimensional) imaging and necessary for future real-time 3D (three-dimensional) imaging. The frame rate can be improved by decreasing the number of transmit events per frame. This has been conventionally accomplished with a proportional reduction in the number of transmit elements used in each transmit event, resulting in poor signal-to-noise ratio (SNR).

Conventional ultrasound beamformers use dynamic focusing during reception of echoes. With this method, the beamformation process is optimized for each depth to achieve as good a beamshape (i.e., narrow beamwidth with low sidelobes) as possible. However, in most systems, a single fixed focus is used during transmit beamformation to try to maintain a good combined beamshape. In areas away from the transmit focus, the beamwidth of the resultant beam widens and the sidelobes increase.

In one known ultrasound imaging system, an improvement to the focal properties is achieved by using multiple transmits aimed at different focal locations or zones. The echoes from these focal zones are used to form subimages, which then are "stitched" together in the final image. While this method optimizes beam properties in most areas of the image and hence begins to approximate $N^2$ performance, this is a major penalty of frame rate, i.e., the speed of sound is sufficiently slow to bring the frame rates down to as low as 5 frames/sec. In typical cases as many as eight transmit focal locations are used, which brings about an 8-fold reduction in frame rate. This penalty is quite severe with lower-frequency probes which are used in clinical situations requiring deep penetration.

A similar limitation associated with data acquisition time occurs even more seriously with color flow mapping, a Doppler-based technique in which typically 4 to 16 transmissions are made in a direction of interest to acquire enough data for clinical utility. One approach that has been implemented to try to overcome this limitation is that of transmitting a wider beam and placing multiple receive beams within the transmit envelope. The resultant beams are not necessarily of good quality; however, given the relatively modest needs of Doppler processing, the method works satisfactorily. The quality of such beams is not sufficient for B-mode imaging.

One attempt to acquire data at a faster rate and with sufficient image quality is disclosed in commonly assigned Thomenius et al. U.S. patent application Ser. No. 09/197, 744, filed Nov. 23, 1998. That application discloses a method and apparatus for acquiring data in high-frame-rate high-resolution (i.e., low f-number) ultrasonic imaging. The technique involves transmitting multiple physically separated beams simultaneously and acquiring imaging data for more than one scan line during receive. Spatial apodization is used to influence the transmit beamformation and to form two controlled and focused spatially separate beams with a single firing of the transducer array elements and without use of additional timing electronics. This method is referred to as "dual beam steering by apodization". Dual beam steering by apodization involves transmission of a single time-delayed focused signal that is separated simultaneously into two distinct beams by imposing a cosinusoidal apodization of the transmitted signals from the elements of the transmitting phased array. The method can be extended to provide improved performance for larger scan angles and larger angular separations of the dual beams. Also the concept is extended to multiple (more than two) transmit beams with a single transmit firing. This concept can also be applied to two-dimensional arrays making it possible to work with a two-dimensional set of transmit beams.

In ultrasound multiline acquisition, multiple receive beams are acquired from a single transmit pulse. An artifact in this acquisition mode is the line warping which can occur when the transmit beam is focused in-between receive beams. Due to the changing transmit beamwidth, the effective receive beam location is pulled towards the center in the area of the transmit focus. Thus there is need for a technique capable of solving the line warping problem.

SUMMARY OF THE INVENTION

In dual line ultrasound beamforming, an ideal transmit beam should have two peak locations each following one of the receive beams. Dual beam steering by apodization creates such transmit beam; however, the resulting beam is optimized for only a single depth and significant line warping can occur away from that depth. The present invention improves the transmit beam shape in ultrasound multiline acquisition by numerically optimizing the transmit beam, i.e., the aperture function, such that no line warping occurs over the entire depth of field. The aperture function is optimized by numerically minimizing a Cost function which is dependent on the aperture function.

The invention is also directed to ultrasound imaging using a multiline acquisition technique in which an aperture function for transmitting a beam having multiple peaks has been numerically optimized.

BRIEF DESCRIPTION OF THE DRAWINGS

FIG. 8 is a flowchart for a numerical optimization technique in accordance with a preferred embodiment of the invention.

DETAILED DESCRIPTION OF THE PREFERRED EMBODIMENTS

Figure 1:
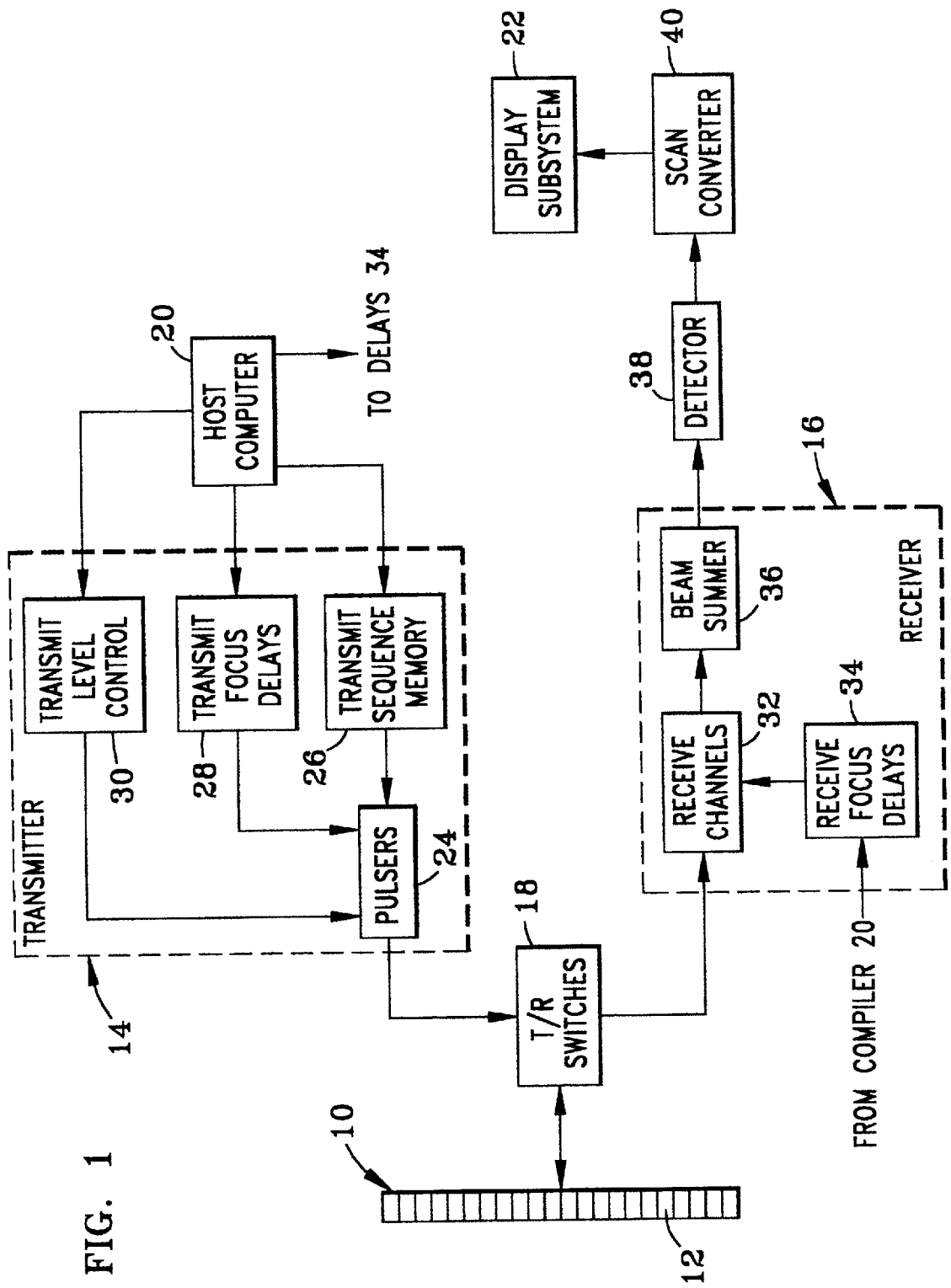
FIG. 1 is a block diagram of an ultrasound imaging system in accordance with the preferred embodiments of the invention.

A typical conventional digital real-time ultrasonic imaging system is generally depicted in FIG. 1. This imaging system comprises a transducer array 10 including a plurality of separately driven transducer elements 12, each of which produces a burst of ultrasonic energy when energized by a pulsed waveform produced by a transmitter 14. The ultrasonic energy reflected back to transducer array 10 from the object under study is converted to an electrical signal by each receiving transducer element 12 and applied separately to a receiver 16 through a set of transmit/receive (T/R) switches 18. Transmitter 14 and receiver 16 are operated under control of a host computer 20 responsive to commands by a human operator. Host computer 20 comprises a central processing unit and associated memory. A complete scan is performed by acquiring a series of echoes in which transmitter 14 is gated ON momentarily to energize each transducer element 12, and the subsequent echo signals produced by each transducer element 12 are applied to receiver 16. A channel may begin reception while another channel is still transmitting. Receiver 16 combines the separate echo signals from each transducer element to produce a single echo signal which is used to produce a line in an image on a monitor of a display subsystem 22.

The base waveform transmitted by each transducer element is determined by a digital transmit sequence stored in a transmit sequence memory 26. Each transducer element 12 in the transmit aperture is pulsed by a pulse waveform produced by a respective bipolar pulser 24 in response to a respective transmit sequence supplied to that pulser from transmit sequence memory 26.

Under the direction of host computer 20, transmitter 14 drives transducer array 10 such that the ultrasonic energy is transmitted as a directed focused beam. To accomplish focusing, respective time delays are imparted to bipolar pulsers 24 by transmit focus delays 28, while respective pulse amplitudes are set by a transmit level control (apodization generation) 30, such as a high-voltage controller which sets the power supply voltage to each pulser. Host computer 20 determines the conditions under which the acoustic pulses will be transmitted. With this information, the transmit focus delays and transmit level control respectively determine the timing and amplitude of each of the transmit pulses to be generated by pulsers 24. Pulsers 24, in turn, send the transmit pulses to each of elements 12 of transducer array 10 via T/R (transmit/receive) switches 18. By appropriately adjusting the transmit focus time delays in a conventional manner, an ultrasonic beam can be directed and focused at a transmit focal position. In accordance with the preferred embodiment of the invention, the host computer is programmed to control transmitter 14 to use spatial apodization and time delays to form two controlled and focused, spatially separate beams with a single firing of the transducer array elements. The apodization and timing functions used to accomplish this are described in more detail below.

The echo signals produced by each burst of ultrasonic energy reflect from objects located at successive ranges along each ultrasonic beam. Due to differences in the propagation paths between a reflecting point and each transducer element, the echo signals are not detected simultaneously and their amplitudes are not equal. For each transmit, the echo signals from transducer elements 12 are fed to respective receive channels 32 of the receiver. Under the direction of host computer 20, the receiver tracks the direction of the transmitted beam. The receiver imparts the proper receive focus time delays 34 to the received echo signals. The receive focus time delays are computed in real-time using specialized hardware, or are read from a look-up table. The time-delayed receive signals are summed in receive beam summer 36 for each transmit firing to provide an echo signal which accurately indicates the total ultrasonic energy reflected from a point located at a particular range along the ultrasonic beam.

When dual beam steering by apodization is used, host computer 20 controls receiver 16 to track the directions of the two transmitted beams, sampling the echo signals at a succession of ranges along each beam. Receiver 16 imparts the proper time delay to each amplified echo signal and sums the amplified echo signals to provide a composite echo signal which accurately represents the total ultrasonic energy reflected from a point located at a particular range along a respective ultrasonic beam. Most conventional systems have the capability of receiving two beams simultaneously. This capability usually does not require two full sets of beamformer channels; in a digital beamformer, the separate beams are formed after several steps of common processing. Thus, receiver 16 will generate two receive beams in a conventional manner, the receive beams corresponding to the two ultrasound beams transmitted at different angles in accordance with a preferred embodiment of the invention. When conventional beamformers perform dual line receive beamformation, the transmit beam is usually widened to cover the area of the two receive beams. The present invention makes it possible to obtain dramatically improved beamformation (by having two separate transmit beams) without requiring any additional timing circuitry.

In the conventional system, the beamsummed receive signals may be bandpass filtered and supplied to a signal processor or detector 38. The bandpass filter (not shown) passes the desired signal components. Detector 38 converts the bandpass-filtered receive signals to display data. In the B-mode (gray-scale), the envelope of the signal comprises the display data, with some additional processing such as edge enhancement and logarithmic compression. Scan converter 40 receives the display data from detector 38 and converts the data into the desired image for display. In particular, scan converter 40 converts the acoustic image data from polar coordinate (R-θ) sector format or Cartesian coordinate linear format to appropriately scaled Cartesian coordinate display pixel data at the video rate. These scan-converted acoustic data are then processed by a video processor incorporated in display subsystem 22 and produced for display on the display system monitor, which images the time-varying amplitude of the envelope of the signal as a gray scale. A respective scan line is displayed for each spatially separate beam transmitted during a single transmit firing.

Dual beam steering (which is extendible to more than two beams) by apodization can be explained in mathematical terms. The response of a narrowband beamformer near its focus is given by the expression:

$$f(u) = \int_{-\infty}^{\infty} a(x)\exp(jk_0 xu)\,dx \quad (1)$$

where f(u) is the transmit response as a function of u=sin(θ), θ is the angle with respect to the array normal, and $k_0=2\pi/\lambda$ is the wave number. As is well known, this expression produces a Fourier transform relation between the aperture function a(x) and the field response as a function of u. In a typical ultrasound application, the function a(x) is used for the purpose of apodization, i.e., to suppress the sidelobes that arise as a consequence of the Gibbs phenomenon.

The technique in accordance with the dual beam steering embodiment uses the a(x) component of Eq. (1) to modify the beam pattern in a manner that allows formation of two or more transmit beams from a single transmission. It is well known from interferometry that use of two point sources will create a sinusoidal field distribution. This is a direct consequence of the Fourier transform characteristic of the narrow band far-field (or focal) beamformation. The invention takes advantage of reciprocity in that if a sinusoidal weighting (apodization) is applied to the array elements, the field pattern will be that of two spatially separated δ-functions. That is, if a weighting $$a(x) = \cos\left(\frac{2\pi x}{d}\right) \quad (2)$$

is applied, where d is the spatial frequency of the sinusoid, the resulting field pattern will be $$f(u) = \frac{1}{2}\left\{\delta\left(u + \frac{\lambda}{d}\right) + \delta\left(u - \frac{\lambda}{d}\right)\right\}. \quad (3)$$

Thus, merely by introducing the cosinusoidal weighting function, two beams are transmitted during a single firing of a multiple-element phased array. This is accomplished without generation of any timing signals or other means usually used for such purposes. Equations (1)–(3) assume infinite apertures. If the aperture is assumed to be finite with a length L, the field response becomes:

$$f(u) = \frac{L}{2}\left\{si\left\{\pi Lu + \frac{\lambda}{\lambda}\right\} + si\left[\frac{\pi L(u-\lambda)}{\lambda}\right]\right\} \quad (4)$$

where the abbreviation "si" has been used for sinc (or sin(x)/x).

The a(x) function used to derive Eq. (4) is windowed by a rect{L} function, hence the sinc terms in the response. The rect-function can be defined as:

rect{x}=1 if x≦L/2, rect{x} =0 if x>L/2, (5)

Figure 3:
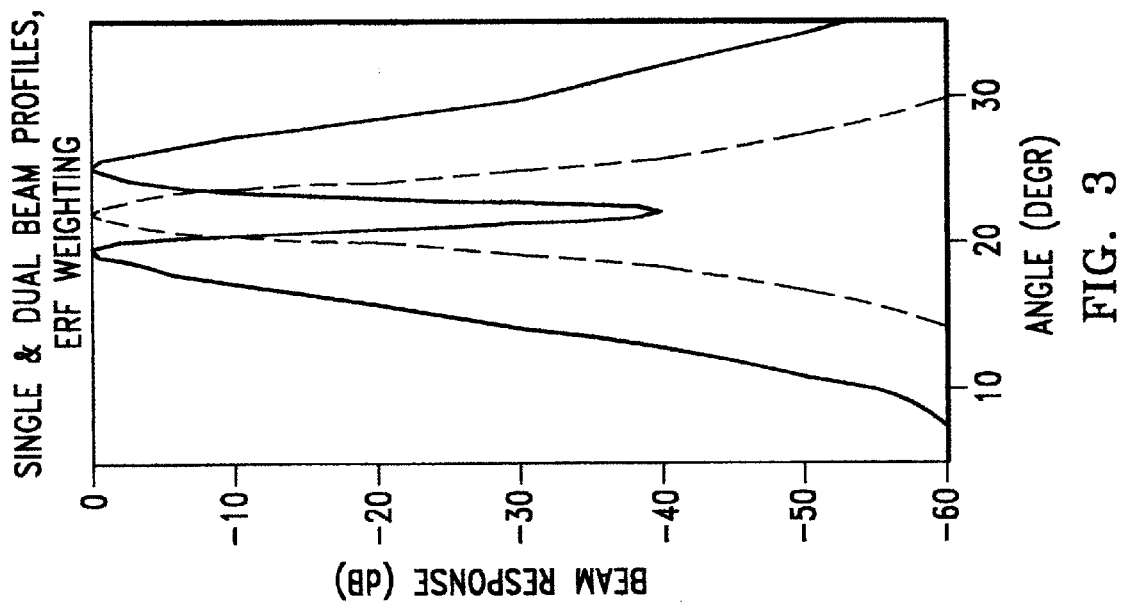
FIG. 3 is a graph of the dual beam profile resulting from application of the transmit apodization weighting function shown in FIG. 2 (solid curve) and the single beam profile for transmission with the same f-number and without apodization.
Figure 2:
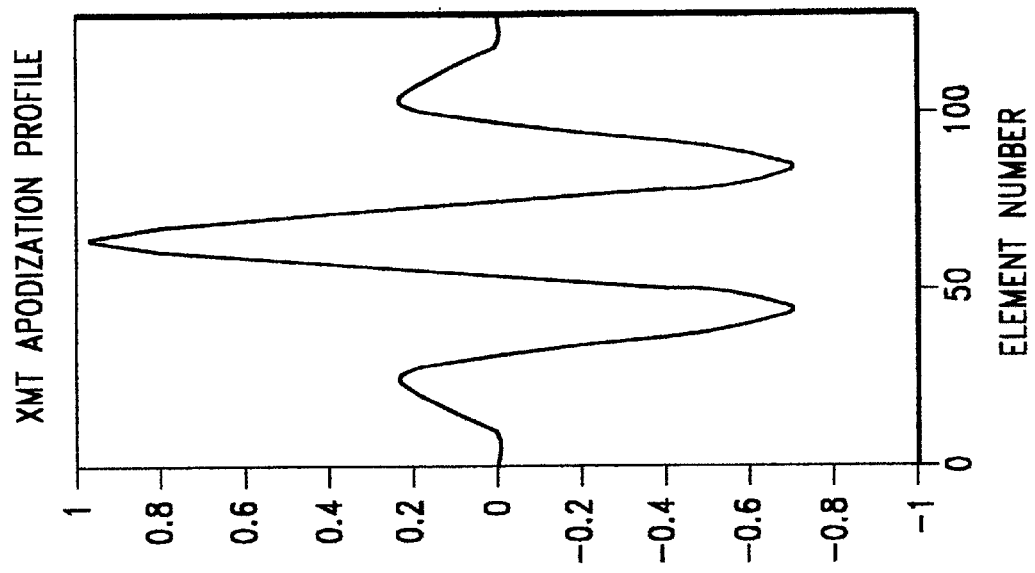
FIG. 2 is a graph of the transmit apodization profile for transmission of a pair of steered ultrasound beams from a 128-element phased array in accordance with one preferred embodiment of the invention.

A more appropriate weighting function can be used to suppress sidelobes associated with the sinc function. FIG. 2 is an example of a sinusoidal weighting function with a Gaussian apodization superimposed on it for sidelobe suppression. The Gaussian function smoothes out the edges of the aperture response and is not necessary for implementation of the invention. FIG. 3 shows the resulting simulated beamshape, wherein the apodization causes two beams to be steered to the right at 19 and 25 degrees. Removal of the apodization while transmitting with the same f-number would cause a single beam to be formed, as depicted by the dash-dot line in FIG. 3.

There may be some loss in lateral and contrast resolution with the wideband signals due to the use of cosinusoidal apodization. This, in effect, limits the aperture size in the simulation. In practice, this loss can be compensated for by using a lower f-number in those instances where the dual beam performance is desired. Given a fairly large selection of possible apodization curves, the designer can optimize performance to the given situation.

There is a natural characteristic of sinusoidal or cosinusoidal functions that make them effective in the present invention. The cosine weighting can be expressed as:

$$\cos\left(\frac{2\pi x}{d}\right) = \frac{1}{2}\left[\exp\left(i2\frac{\pi x}{d}\right) + \exp\left(-i2\frac{\pi x}{d}\right)\right] \quad (6)$$

One way to interpret the right-hand side of Eq. (6) is that these are the phase delays (usually expressed as complex exponentials) corresponding to the steering delays required to steer the beam in the two desired directions.

The cosinusoidal apodization as in Eq. (2) is a relatively simple expression and has limited range of validity in applications such as medical ultrasound. A more generally applicable expression is given in the aforementioned U.S. patent application Ser. No. 09/197,744 which is based on the assumption of a Gaussian transmit waveform and single scattering from the targets. An expression for the point spread function (PSF) is formed by summing the transmitted and received signals. By varying the apodization function used during the transmit operation, a beam with multiple peaks can be generated.

Figure 4:
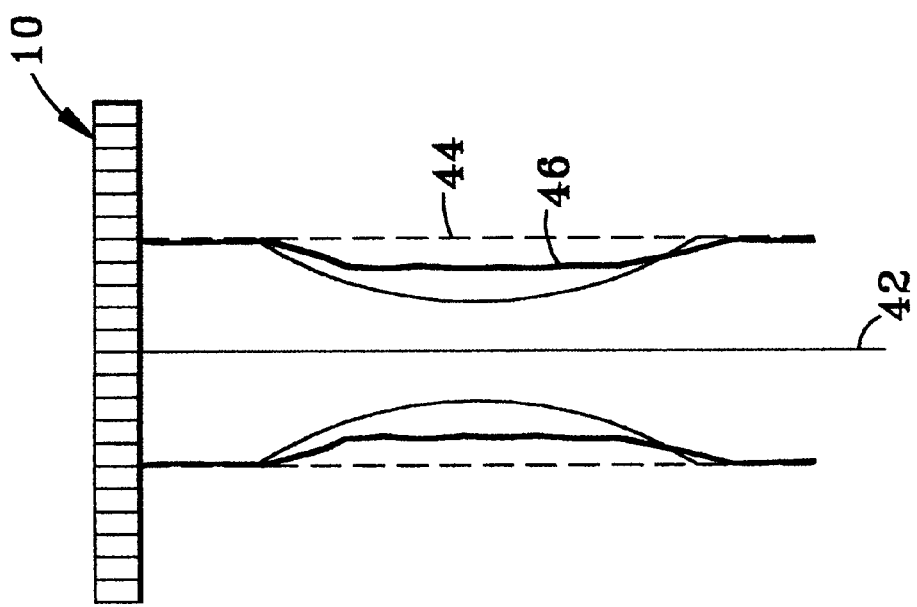
FIG. 4 is a schematic illustration showing dual line beam acquisition and associated line warping. The bold lines indicate the effective receive beam location; the solid lines indicate the transmit beam and beamwidth; and the dotted lines indicate the desired receive beam location.

An artifact in the ultrasound multiline acquisition mode is the line warping which can occur when the transmit beam is focused in between receive beams. FIG. 4 shows an example where the transmit beam 42 in the center is straddled by two receive beams. The desired receive beam locations 44 are depicted as dotted lines. However, due to the changing transmit beamwidth the effective receive beam locations 46 are pulled towards the center in the area of the transmit focus.

Figure 5:
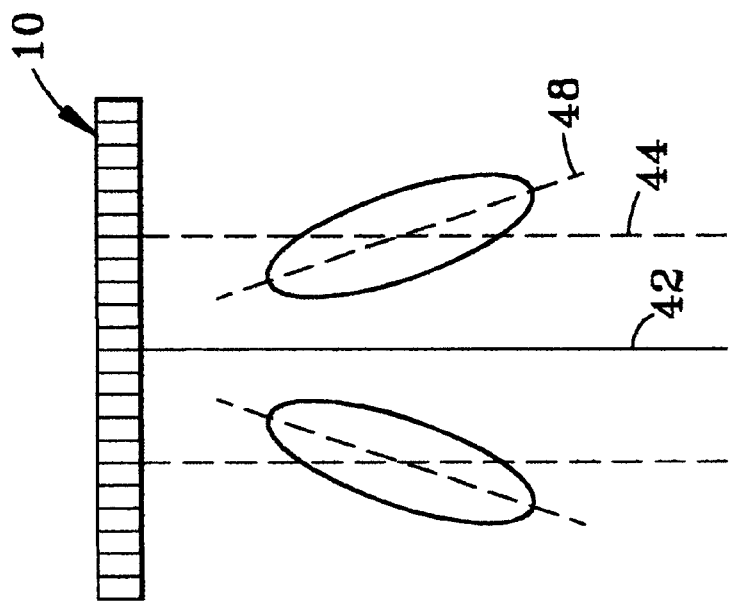
FIG. 5 is a schematic illustration showing the mismatch between the desired receive beam path and the effective transmit beam path achieved using dual beam steering by apodization without numerical optimization. The solid lines indicate the transmit center; the dashed lines indicate the desired receive beam path; and the dotted lines indicate the effective transmit beam path.

The dual beam steering technique mitigates line warping by generating a transmit beam with lateral peaks at the location of the desired receive beam. This is achieved by appropriately selecting aperture weighting and delay functions. While the method eliminates the line warping shown in FIG. 4, it can create a different type of warping. The beam splitting is controlled at only a single depth. Before and after that depth, the beam follows some natural path which might be different from the desired receive beam path. FIG. 5 shows this situation for a linear array 10. The desired receive beam paths 44 (dashed lines) are perpendicular to the transducer array while the effective transmit beam paths 48 (dotted lines) are oblique to array 10. Because the effective transmit beam paths 48 intersect array 10 close to its center, such beam paths would be suitable for a sector image. For a rectilinear or trapezoidal image format, however, some line warping occurs.

Figure 7:
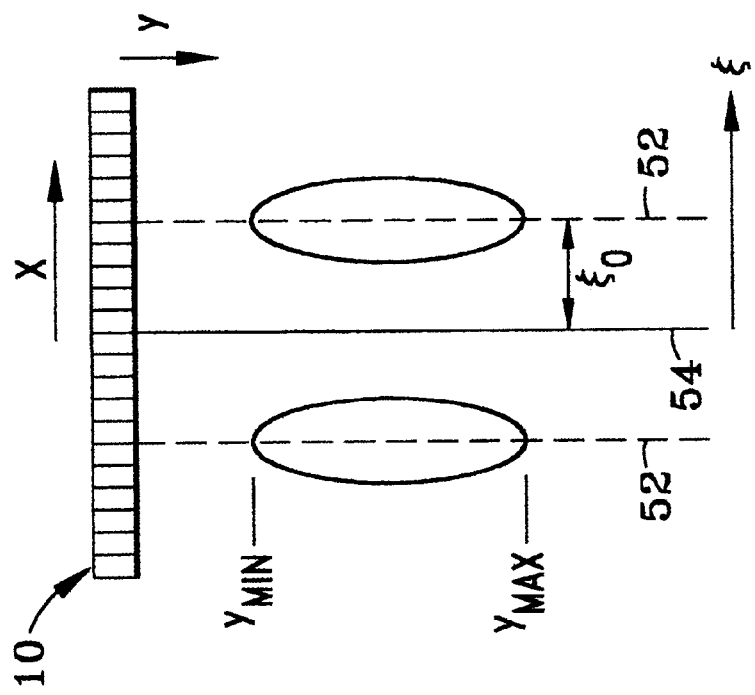
FIG. 7 is a schematic illustration identical to FIG. 6 except that example geometry for numerical beam optimization is indicated.
Figure 6:
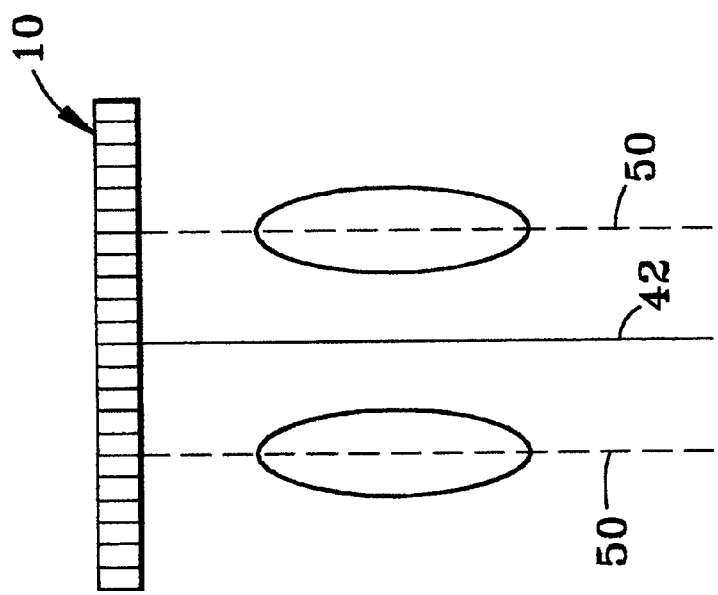
FIG. 6 is a schematic illustration showing the optimized transmit beam path achieved using dual beam steering by apodization with numerical optimization in accordance with a preferred embodiment of the invention. The solid lines indicate the transmit center; the dashed lines indicate the desired receive beam path and the effective transmit beam path.

In accordance with a preferred embodiment of the invention, this problem of line warping is overcome by controlling the effective transmit beam path. The aperture weighting and delay functions are optimized such that the effective transmit beam path coincides with the desired receive beam path as shown by dashed lines 50 in FIG. 6;

that is transmit delay and weighting functions are found which create a transmit beam that follows some desired path. This is achieved by using a numerical optimization method. A Cost function is defined which increases when the actual beamshape deviates from the desired one. Minimizing this Cost function yields the optimal delay and weighting functions. The approach is best illustrated through an example. FIG. 7 shows the geometry for numerical optimization using linear array 10. The desired transmit beam has two lateral intensity peaks 52 (dashed lines) which are offset by $\xi_0$ to either side of the array center 54. The intensity peaks should run in parallel. For practical reasons it is not possible to generate such beam over an arbitrary depth range. Therefore, the optimization is limited to the range $[y_{min}, y_{max}]$. (In the end, this range becomes one of the trade-off parameters together with optimization accuracy, lateral separation, etc.).

The desired transmit beam has the following characteristics:
a) the beam is symmetric around the array center;
b) in the mainlobe region, at $\xi_0$, the beam must have a certain pulse energy;
c) in the sidelobe region the pulse energy should be as low as possible; and
d) the lateral beam profile should have a peak at $\xi_0$.

These beam characteristics are transformed into a Cost function for the aperture optimization. The Cost function is not unique, since a number of variations could yield similar results. What is shown here is one implementation which works well. To establish the Cost function, the beam profile is first needed. Since the beam profile is evaluated a large number of times during the optimization, a narrow-band approximation (phasor) method is applied. From the geometry in FIG. 7, the amplitude squared beam profile is derived as:

$$b(\xi, y) = \left| \int a(x) e^{jk\sqrt{(\xi-x)^2+y^2}} dx \right|^2 \quad (7)$$

where a(x) is the complex aperture function and k is the wave number.

The characteristics a) through d) set forth above are interpreted in terms of the beam profile $b(\xi, y)$:
a) Symmetry: the aperture delay and weighting functions are symmetric in x; that is, a(x)=a(−x);
b) in the mainlobe region the beam must have a certain pulse power $W_0$; i.e., $$\frac{1}{y\_max - y\_min} \int_{y\_min}^{y\_max} b(\xi_0, y) dy \geq W_0. \quad (8)$$

Equation (8) only makes sense in conjunction with a limitation on the transmitted power. Therefore, the transmit power is limited by $$\int |a(x)|^2 dx \leq W_{TX}; \quad (9)$$

c) in the sidelobe region the pulse energy should be as low as possible:

$$\frac{1}{y\_max - y\_min} \int_{y\_min}^{y\_max} \int_{\xi_{sl}}^{\infty} b(\xi, y) d\xi dy \leq W_{sl}; \quad (10)$$

d) the lateral beam profile should have a peak at $\xi_0$, which implies that the derivative of the profile should be zero:

$$\frac{\partial}{\partial \xi} b(\xi, y) \Big|_{\xi=\xi_0} = 0. \tag{11}$$

Since this criterion should be valid over the depth of field, it needs to be square integrated:

$$\int_{y\_\min}^{y\_\max} \left| \frac{\partial}{\partial \xi} b(\xi, y) \Big|_{\xi=\xi_0} \right|^2 dy \leq \text{const.} \tag{12}$$

Equations (7)–(12) implicitly depend on the complex aperture function a(x) since the beam profile b($\xi$, y) depends on a(x).

The Cost function can now be defined as $$\text{Cost}[a(x)] = A \bigg/ \int_{y\_\min}^{y\_\max} b(\xi_0, y) dy + B \int_{y\_\min}^{y\_\max} \int_{\xi_{SI}}^{\infty} b(\xi, y) d\xi dy + C \int_{y\_\min}^{y\_\max} \left| \frac{\partial}{\partial \xi} b(\xi, y) \Big|_{\xi=\xi_0} \right|^2 dy. \tag{13}$$

The coefficients A, B and C control the relative contributions of the components in Eq. (13) to the Cost function. The optimization result depends to some degree on the selection of these coefficients. However, an empirical coefficient selection should be adequate.

The optimal aperture function can be found by minimizing Cost[a(x)] subject to a(x)=a(−x) and $\int |a(x)|^2 dx \leq W_{TX}$. The last constraint is necessary to ensure that the beam peak energy is maintained without arbitrarily increasing the transmit power.

The numerical optimization can be done with a number of algorithms. The example below uses a least squares method. Since the least squares algorithm only finds a local minimum, an appropriate starting point must be selected. The cosinusoidal apodization is used as that starting point.

First, the optimization problem is discretized such that all integrals become summations: a(x)→$a_n$, where n is the element number.

Next, the constrained optimization problem is transformed into an unconstrained one. The symmetry constraint ($a_n$=$a_{-n}$) is enforced by optimizing only half of the aperture (n>0) and mirroring the other half. The transmit energy constraint is implemented by scaling the aperture by its own root-mean-square (rms) value; thus, $$a_n := \frac{a_n}{\sqrt{\frac{2 \sum_{k=0}^{N/2} |a_k|^2}{W_{TX}}}}. \tag{14}$$

This normalization must be applied whenever the optimization calculates a new aperture function. With that, the optimization reduces to the unconstrained problem: minimize Cost($a_n$) with n=[0,N/2] and the previous power normalization from Eq. (14).

The steps performed in accordance with a least squares optimization are depicted in FIG. 8. In accordance with this preferred embodiment, the cosinusoidal apodization is selected as the initial aperture function a(x) (step 60 in FIG. 8). The next step 62 determines the gradient of the Cost function for the present aperture function: g=grad[Cost(a)]. A scalar $\lambda$ is then found at step 64 which minimizes the Cost function along the gradient, min Cost(a+$\lambda$·g), that optimal value being designated $\lambda_{opt}$. At step 66 the aperture function is updated, i.e., the old aperture function is stored as $a_{old}$ and a new aperture function is calculated as a:=a+$\lambda_{opt}$g. Then a new Cost function is calculated. At a decision step 68, a determination is made as to whether the absolute value of the difference between the new and old Cost functions is less than a first predetermined limit. Steps 62, 64, 66 and 68 are repeated until |ΔCost| is less than the first predetermined limit, in which event a determination is made at step 70 as to whether norm($\lambda_{opt}$g) is less than a second predetermined limit. If not, then steps 62, 64, 66, 68 and 70 are repeated. If norm($\lambda_{opt}$g) is less than the second predetermined limit, then the present aperture function is adopted as the optimized aperture. Referring to FIG. 1, host computer 20 then controls the transmit levels and transmit focus delays in accordance with the optimized aperture function for each transmit firing.

A number of similar optimization methods yield substantially the same result. See, e.g., the numerical optimization methods disclosed in "Optimization Toolbox; User's Guide," The Mathworks, Inc., December (1996) and G. R. Walsh, "Methods of Optimization," John Wiley & Sons (1975). Furthermore, any one of these methods comes in a number of variations. The present invention is not limited to use of any particular optimization method.

In accordance with the basic concept of the invention, the desired beam characteristics are converted into a Cost function and that Cost function is numerically optimized, e.g., minimized. The Cost function is established by calculating the beam pattern from the aperture function (amplitude and time delay), extracting several parameters from the beam pattern and combining those parameters into the Cost function.

Figure 9:
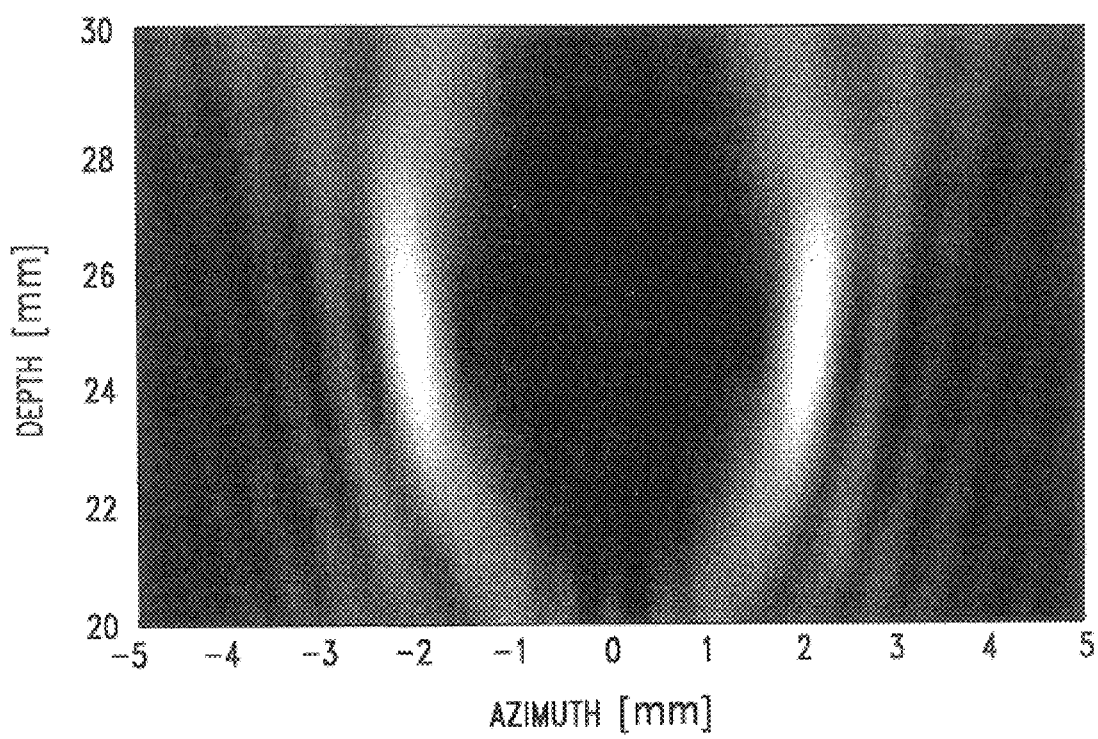
FIG. 9 is a computer-generated image showing a simulated dual line transmit beam produced using cosinusoidal apodization without numerical optimization.
Figure 10:
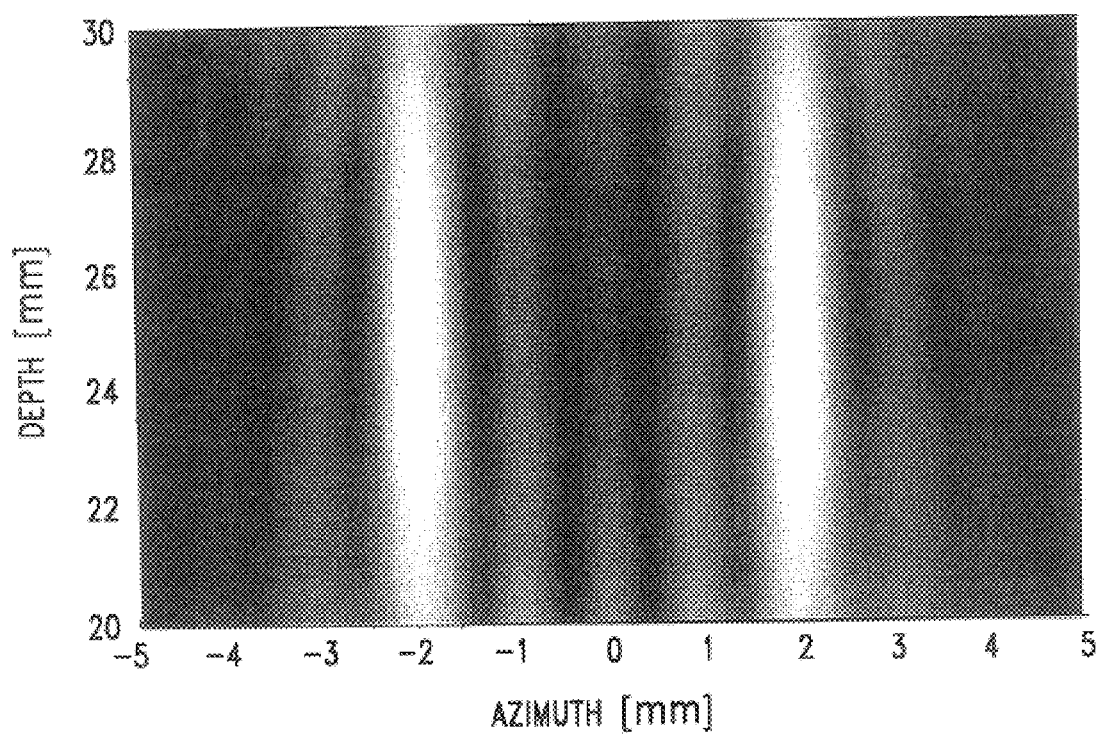
FIG. 10 is a computer-generated image showing a simulated dual line transmit beam produced using cosinusoidal apodization with numerical optimization in accordance with a preferred embodiment of the invention.

The following numerical example demonstrates the capability of the disclosed method. The goal in this simulation was to create two parallel beams which are offset by ±2 mm from the aperture center. The desired depth of field was 20–30 mm with a focal point at 25 mm. FIG. 9 shows the transmit beam pattern with azimuth on the horizontal axis and depth on the vertical axis. This profile was generated with cosinusoidal apodization without numerical optimization. The desired beam split of ±2 mm occurred at the focal depth (25 mm). However, the split was not constant over depth, and thus the beams seen in FIG. 9 are not parallel. FIG. 10 shows the result when cosinusoidal apodization is combined with numerical optimization. It is obvious that the beams in FIG. 10 are substantially parallel. Also, the optimization increased the depth of field to the desired 20–30 mm.

The foregoing example is given for the purpose of illustration only. A transmit beam with more than two lateral intensity peaks can also be optimized. Further, transmit paths which are not parallel but rather follow a sector, trapezoidal or other format are possible by specifying a proper Cost function.

The invention has application in medical ultrasonic imaging. However, due to its nature, the invention is also applicable to other coherent imaging methods (such as radar, side-looking radar or microwave).

The invention reduces the line warping artifacts of prior art multiline acquisition methods.

Previously, multiline acquisition was limited to color flow imaging where the warping artifact is less noticeable. The invention opens up the possibility of applying multiline acquisition in B-mode imaging.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A system for imaging ultrasound scatterers, comprising:
an ultrasound transducer array for transmitting ultrasound waves and detecting ultrasound echoes reflected by ultrasound scatterers, said transducer array comprising a multiplicity of transducer elements;
a multiplicity of pulsers respectively coupled to said multiplicity of transducer elements for pulsing selected transducer elements which form a transmit aperture with a respective multiplicity of transmit waveforms;
pulser activation circuitry coupled to said pulsers for generating said multiplicity of transmit waveforms with respective time delays and respective apodization weightings determined in accordance with an aperture function designed to cause said selected transducer elements of said transmit aperture to transmit first and second transmit beams along first and second transmit beam paths during a transmit firing;
a receiver coupled to said transducer array for receiving a set of receive signals from selected transducer elements which form a receive aperture subsequent to said transmit firing and for forming first and second beamsummed receive signals from said set of receive signals corresponding to first and second receive beam paths; and
a display subsystem for displaying an image having a first scan line which is a function of said first beamsummed receive signal and a second scan line which is a function of said second beamsummed receive signal,
wherein said first and second transmit beam paths substantially coincide with said first and second receive beam paths respectively.

2. The system as recited in claim 1, wherein said aperture function is derived from a cosinusoidal function.

3. The system as recited in claim 2, wherein said aperture function is derived from said cosinusoidal function by numerical optimization of a Cost function, said Cost function being a function of a beam profile function.

4. The system as recited in claim 3, wherein said Cost function is:

$$Cost\left[a(x) = \right.$$
$$\left. A \int \int_{y\_min}^{y\_max} b(\xi_0, y) \, dy + B \int_{y\_min}^{y\_max} \int_{\xi_{sI}}^{\infty} n(\xi, y) \, d\xi \, dy + C \int_{y\_min}^{y\_max} \left| \frac{\partial}{\partial \xi} b(\xi, y) \right|_{\xi=\xi_0} \right|^2 dy.$$

5. The system as recited in claim 3, wherein said numerical optimization is based upon a least squares algorithm.

6. A method for imaging ultrasound scatterers, comprising the steps of:
generating a multiplicity of transmit waveforms with respective time delays and respective apodization weightings determined in accordance with an aperture function designed to cause selected transducer elements of a transducer array to form a transmit aperture to transmit first and second transmit beams along first and second transmit beam paths during a transmit firing;
pulsing said selected transducer elements of said transducer array in accordance with said multiplicity of transmit waveforms to from said transmit aperture during a transmit firing;
receiving a set of receive signals from selected transducer elements which form a receive aperture subsequent to said transmit firing;
beamforming first and second beamsummed receive signals from said set of receive signals corresponding to first and second receive beam paths; and
displaying an image having a first scan line which is a function of said first beamsummed receive signal and a second scan line which is a function of said second beamsummed receive signal,
wherein said first and second transmit beam paths substantially coincide with said first and second receive beam paths, respectively.

7. The method as recited in claim 6, wherein said aperture function is derived from a cosinusoidal function.

8. The method as recited in claim 7, wherein said aperture function is derived from said cosinusoidal function by numerical optimizing a Cost function, said Cost function being a function of a beam profile function.

9. The method as recited in claim 8, wherein said Cost function is:

$$Cost\left[a(x) = \right.$$
$$\left. A \int \int_{y\_min}^{y\_max} b(\xi_0, y) \, dy + B \int_{y\_min}^{y\_max} \int_{\xi_{sI}}^{\infty} n(\xi, y) \, d\xi \, dy + C \int_{y\_min}^{y\_max} \left| \frac{\partial}{\partial \xi} b(\xi, y) \right|_{\xi=\xi_0} \right|^2 dy.$$

10. The method as recited in claim 8, wherein said numerical optimizing is based upon a least squares algorithm.

11. A method of programming an ultrasound transmitter for activating an ultrasound transducer array comprising a multiplicity of ultrasound transducer elements, comprising the steps of:
(a) formulating a Cost function as a function of an aperture function defining transmit time delays and apodization weightings for said multiplicity of ultrasound transducer elements;
(b) calculating an i-th value of said Cost function for an i-th aperture function;
(c) determining an (i+1)-th aperture function different than said i-th aperture function;
(d) calculating an (i+1)-th value of said Cost function for said (i+1)-th aperture function;
(e) calculating a difference between said i-th and said (i+1)-th values of said Cost function;
(f) repeating steps (b) through (e) iteratively, starting with i=1;
(g) from one or more aperture functions for which said difference in step (e) is less than a first predetermined limit, determining an optimized aperture function; and
(h) programming said transmitter with transmit time delays and apodization weightings in accordance with said optimized aperture function.

12. The method as recited in claim 11, wherein the aperture function for i=1 is a cosinusoidal function.

13. The method as recited in claim 11, wherein the step of determining an (i+1)-th aperture function comprises the steps of:

determining a gradient of said Cost function for said i-th aperture function;

finding a scalar value which minimizes said Cost function along said gradient; and determining said (i+1)-th aperture function as a function of said i-th aperture function and a product of said gradient and said scalar value.

14. The method as recited in claim 11, wherein said Cost function is:

$$Cost\left[a(x) = \right.$$
$$A \bigg/ \int_{y\_min}^{y\_max} b(\xi_0, y) \, dy + B \int_{y\_min}^{y\_max} \int_{\xi_{sl}}^{\infty} n(\xi, y) \, d\xi \, dy + C \int_{y\_min}^{y\_max} \left| \frac{\partial}{\partial \xi} b(\xi, y) \right|_{\xi=\xi_0} \right|^2 dy.$$

15. The method as recited in claim 13, wherein the step of determining an optimized aperture function comprises determining whether the norm of said product of said gradient and said scalar value is less than a second predetermined limit.

16. An imaging system comprising:

a transducer array comprising a multiplicity of transducer elements for transmitting wave energy in response to electrical activation and transducing returned wave energy into electrical signals;

a display subsystem for displaying display image data; and a computer programmed to initiate the following steps:

activate transducer elements of said array with a multiplicity of transmit waveforms with respective time delays and respective apodization weighting determined in accordance with an aperture function designed to cause said transducer elements of a transmit aperture to transmit first and second transmit beams along first and second transmit beam paths during a transmit firing;

beamform first and second beamsummed receive signals corresponding to first and second receive beam paths subsequent to said transmit firing, wherein said first and second transmit beam paths substantially coincide with said first and second receive beam paths respectively; and control said display subsystem to display an image having a first scan line which is a function of said first beamsummed receive signal and a second scan line which is a function of said second beamsummed receive signal.

17. The system as recited in claim 16, wherein said aperture function is derived from a cosinusoidal function.

18. The system as recited in claim 17, wherein said aperture function is derived from said cosinusoidal function by numerical optimization of a Cost function, said Cost function being a function of a beam profile function.

19. The system as recited in claim 18, wherein said Cost function is:

$$Cost\left[a(x) = \right.$$
$$A \bigg/ \int_{y\_min}^{y\_max} b(\xi_0, y) \, dy + B \int_{y\_min}^{y\_max} \int_{\xi_{sl}}^{\infty} n(\xi, y) \, d\xi \, dy + C \int_{y\_min}^{y\_max} \left| \frac{\partial}{\partial \xi} b(\xi, y) \right|_{\xi=\xi_0} \right|^2 dy.$$

20. The system as recited in claim 18, wherein said numerical optimization is based upon a least squares algorithm.

* * * * *